INVENTORS
RONALD R. SCHMIDT &
MONTY H. RIAL

BY
Mason, Fenwick & Lawrence
ATTORNEYS

FOLDABLE STRUCTURE

Filed July 26, 1968 5 Sheets-Sheet 2

INVENTORS
RONALD R. SCHMIDT &
MONTY H. RIAL
BY
Mason, Fenwick & Lawrence
ATTORNEYS INVENTORS
RONALD R. SCHMIDT &
MONTY H. RIAL
BY
Mason, Fenwick & Lawrence
ATTORNEYS Jan. 26, 1971 R. R. SCHMIDT ET AL 3,557,500

FOLDABLE STRUCTURE

Filed July 26, 1968 5 Sheets-Sheet 4

INVENTORS
RONALD R. SCHMIDT
& MONTY H. RIAL
BY
Mason Fenwick & Lawrence
ATTORNEYS Jan. 26, 1971 R. R. SCHMIDT ET AL 3,557,500

FOLDABLE STRUCTURE

Filed July 26, 1968 5 Sheets-Sheet 5

INVENTORS
RONALD R. SCHMIDT &
MONTY H. RIAL
BY
Mason, Fenwick & Lawrence
ATTORNEYS 3,557,500
FOLDABLE STRUCTURE
Ronald R. Schmidt, Fayetteville, Ark., and Monty H. Rial, Dallas, Tex., assignors to Structex Corporation, Dallas, Tex., a corporation of Texas
Filed July 26, 1968, Ser. No. 747,858
Int. Cl. E04b *1/344*
U.S. Cl. 52—69 9 Claims

ABSTRACT OF THE DISCLOSURE

Structural units of X or Y formation, so proportioned that when units are connected to one another by similar members of one unit being pivotally connected to like members of another unit, a collapsible, curving, pantographic, structural frame is achieved, suitable for use as a shelter frame. Multiples of the frames in spaced relation with roof panels and floor panels hingedly attached provide collapsible shelters. When the end members of frames are connected together, frames for columnar structures are obtained. Power means may be employed to erect the shelters. The frames can also be arranged diametrically at equi-spaced angles to a common center to produce another form of shelter.

BACKGROUND OF THE INVENTION

This invention relates to collapsible structural units, and to portable structures including the units as parts thereof, which may be collapsed, or folded, into compact packages for transportation from one site of use to another.

Structures composed of pluralities of similar structural units have been used in the past. Although some of these were demountable, they had to be taken apart for transportation, and when assembled always formed the same structure. In other words, they could not be assembled in different quantities, or in different order, to produce a different structure. If different structures were required, units of different size or shape, or both, were necessary.

Collapsible, or foldable, structures are also known. With these, the structural units, or elements, were designed to produce a given structure. If other structures should be needed, elements of different type had to be designed.

With both of the above-described types, there is a lack of flexibility, a lack of ability to change from one structure to a modified one without a change in the basic structural unit.

SUMMARY OF THE INVENTION

The general object of the present invention is to provide structural units which can be used in combination with other similar units to form structures of different shape and size.

A more specific object is to provide structural units which can be pivotally interconnected to form a frame which follows a curved path when erected, and which can collapse for storage or transportation.

It is also an object to provide such units which can be pivotally interconnected to form collapsible frames which can be used in spaced relation with joined, or separable, cover members to construct collapsible, or foldable, shelters.

Another object is to provide a portable building assembly in which the component members are pivotally interconnected in such manner that a structure erected therefrom may be collapsed in folded and compact package form without disconnection, or detachment, of any of the various pivotal connections employed in the assembled structure.

A further object of the invention is to provide a structural frame composed of the structural units and having a novel power erector, which, optionally, may be attachable to the frame or a permanent part thereof, by means of which the frame, or a building assembly of which the frame is a part, may be brought to erected position.

Other objects of the invention will become apparent from the following description of preferred embodiments thereof, when taken with the drawings which accompany and form part of, this specification.

DESCRIPTION OF THE PREFERRED EMBODIMENTS

In general, the invention consists of two basic types of structural units, and frames, and buildings using such frames, composed of optional selective combinations of one, or both, of the basic units. The basic units consist of pairs of leg members in side-by-side relation for independent rotation in parallel planes about a common, interconnecting pivotal axis. The frames are composed of series of the units pivotally connected at the leg ends to provide a frame which describes a continuous curve.

Figures 1, 2, 3:
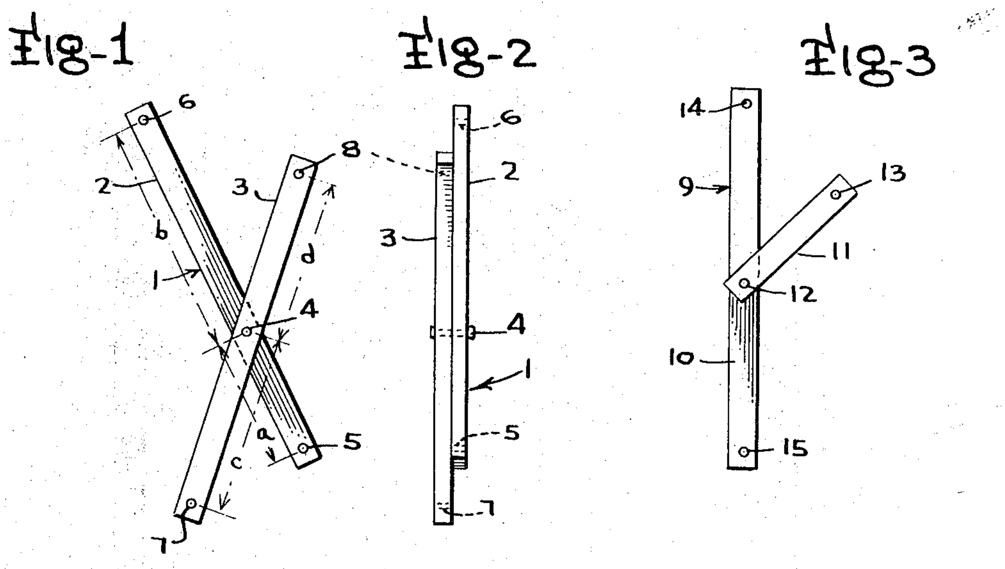
FIG. 1 is a side elevation of a basic structural unit of the present invention.
FIG. 2 is an end view of the unit.
FIG. 3 is a side elevation of another form of basic structural unit.
Figure 4:
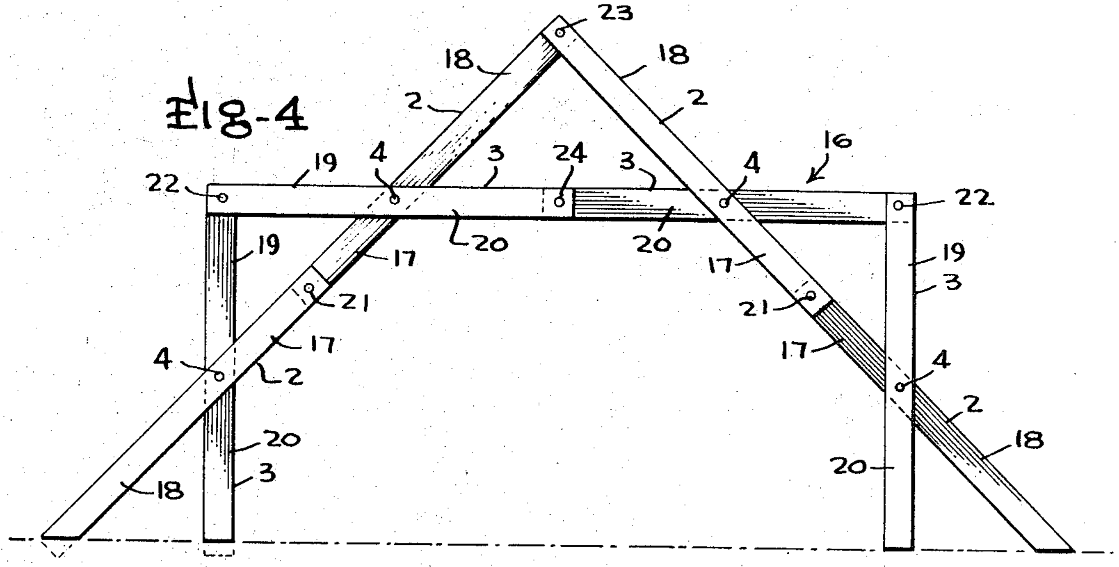
FIG. 4 is a side elevation of a structural frame composed of interconnected units of the type shown in FIG. 1, the frame being shown in erected form.
Figure 5:
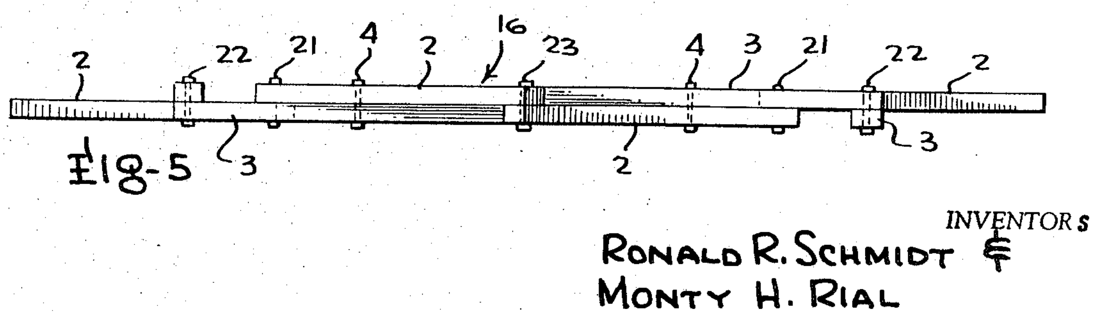
FIG. 5 is a top plan view of the frame shown in FIG 4.

The most commonly used of the two basic units is the unit 1 shown in FIGS. 1 and 2. It consists of two legs 2 and 3 connected intermediate their ends by means of a pivot pin 4. The two legs may or may not be the same length, and the pivot will enter one of them at a point removed from the longitudinal center of the leg. The other leg may, or may not, have the pivot at its longitudinal center and still conform to the requirements of the invention. In other words, when leg 2 has end pivot openings 5 and 6, and leg 3 has end pivot openings 7 and 8, the distance *a* from pivot pin 4 to pivot opening 5 of leg 2 is never equal to distance *b* from pivot pin 4 to pivot opening 6, whereas the distance *c* from pivot pin 4 to pivot opening 7 of leg 3 may, or may not, be equal to distance *d* from pivot pin 4 to pivot opening 8.

Another critical factor in the proportions of the legs of the unit is that the sum of the distances *c* and *d* is always greater than the sum of the distances *a* and *d*.

The two legs making up the unit are mounted in side-by-side relation, and are free to swing with a scissor action to form an X-shape, or to fold into aligned superimposed relation.

The unit shown in FIG. 3 differs from the one just described only in having one section of one of the legs removed. As shown, it is the section *d* of the leg 2 which is not used. Thus, the unit 9 is Y-shaped, having a leg 10 and a short leg 11, the two being pivotally interconnected by a pivot pin 12 which passes through the leg 10 intermediate its ends, as in the previously described form, and through leg 11 adjacent one end. Leg 11 has an outer pivot pin opening 13, while leg 10 has end pivot openings 14 and 15. With this type of unit, the only critical factor is that the short leg 11 is never the length of that section of leg 10 from pivot pin 12 to the end pivot opening 14.

The basic units 1 and 9 just described, can be connected to one another to form frames for structures of various kinds. It is important that when the units are joined to one another, that similar sections of adjacent units be pivotally interconnected. For example, if two units 1 are interconnected they are joined in reverse position so that connecting pivot pins will be passed through the pivot openings 5 of the two sections, and pivot pins will be passed through the companion pivot openings 7 of the two units. As the unit 9 is similar to the unit 1, except for the fact that one leg is removed, when a unit 9 is connected to a unit 1, or one unit 9 connected to another unit 9, similar legs are joined as when two units 1 are connected. Thus, the units will lie in reverse order from one end of the frame to the other. This accomplishes two purposes. It causes the units to follow a curved path, so that end units can rest upon the ground while the center units are raised above the ground, and it provides the legs of adjacent units in proper parallel planes for folding without collision as the frame is collapsed.

Referring now to FIGS. 4 through 7, it will be seen that four of the units 1 connected end to end will form a frame 16. In order to simplify the description, the sections of the legs of the unit 1 have been identified by reference numerals. Thus, that section of leg 2 corresponding to the distance *a* is shown at 17, the section corresponding to distance *b* has the numeral 18, the section of leg 3 corresponding to distance *c* is 19, while the section of leg 3 corresponding to distance *d* is indicated as 20.

It follows from the previous description, therefore, that when two units are to be joined, section 17 of one unit will be joined to section 17 of a second unit, and the two will be secured together by pivot pin 21 passing through the end pivot openings 5 of the two units. Similarly, the sections 19 of the adjacent units will be joined by passing a pivot 22 through the openings 7 of the two units. When the next section is to be added, the opposite ends of units are joined, so that two sections 18 will be joined by a pivot pin 23 passing through the openings 6 of the two units. To complete the connection, sections 20 are joined by pivot pin 24 through their similar openings 8. The connection of the fourth unit to the third one will be a duplication of the first unit to the second.

When the units are connected as above-described, it will be found that the distance from 22 through 4 to 21 is the same in both directions, and that the distance from 23 through 4 to 24 is also equal in both directions. Further, the distance 22 through 4 to 23 is always greater than the distance from 21 through 4 to 24. With this arrangement, the frame is free to collapse and, when erected, will place the units along a curved path to define a frame.

Figure 6:
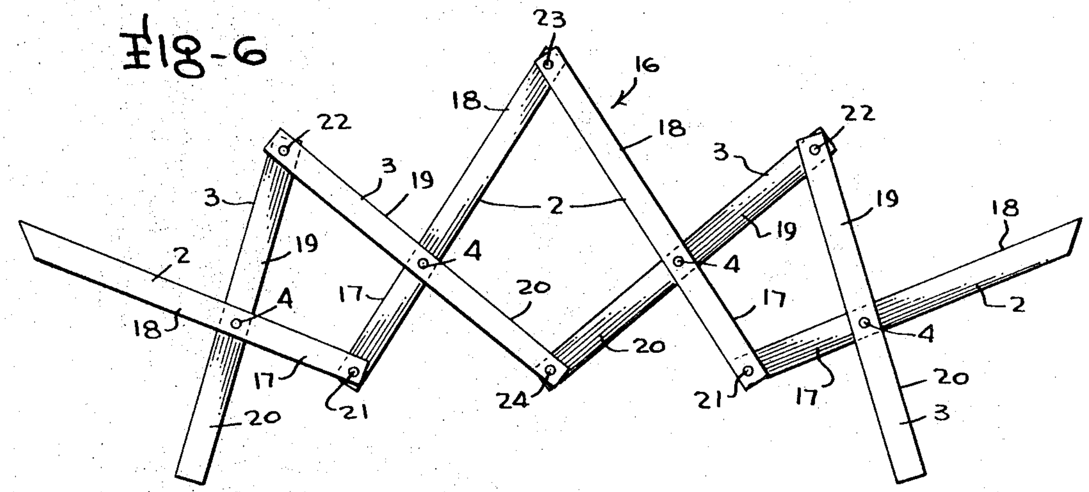
FIG. 6 is a side elevation of the frame partially collapsed.
Figures 7, 8:
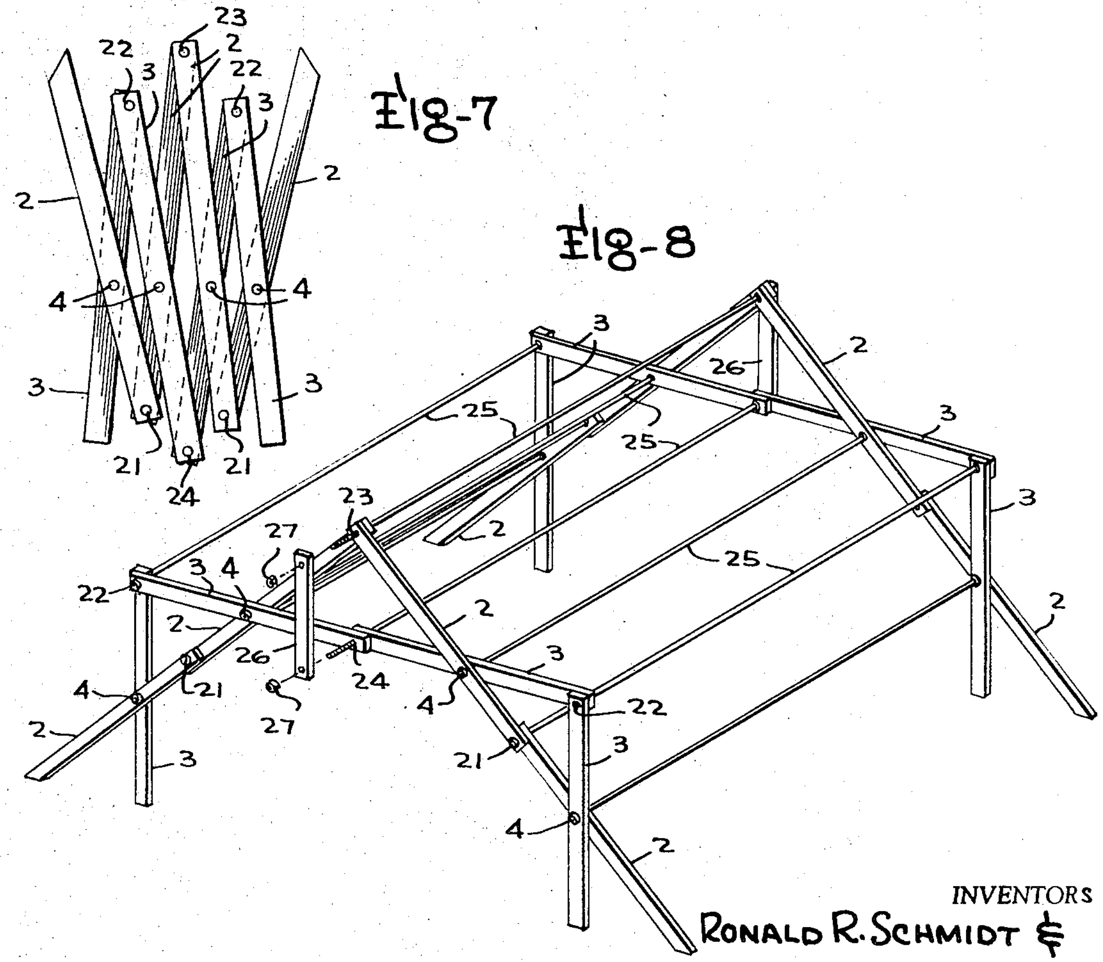
FIG. 7 is a side elevation showing the frame substantially collapsed.
FIG. 8 is a perspective view of a pair of frames in spaced relation joined by rods to form a complete shelter frame.

FIGS. 6 and 7 show the frame in different stages of collapsing. To collapse the frame of FIG. 4, the two pivots 21 and the pivot 22 move away from one another, and the two pivots 24 and pivot 23 move from one another. This causes section 17 of each leg 2 to approach section 20 of leg 3, and section 18 of leg 2 to approach section 19 of leg 3. This is the position shown in FIG. 6. Further movement of the end members toward one another brings the legs of the respective units into substantial overlying position, with each leg of the units being in edge contact with the opposite leg of adjacent units. When this position is reached, the frame is fully collapsed.

Two or more frames 16 may be connected together to form a complete structural frame. Such an arrangement is shown in FIG. 8. As the frames are identical to the one shown in FIG. 4, the same reference characters have been used.

When one type of building frame is desired, two or more of the frames 16 are mounted in spaced relation, with the spacing being maintained by means of rods 25 which, not only hold the frames in spaced relation, but may also serve as the various pivots of the frames. Rods 25 may form the main pivotal connections 4 between the legs of the basic units as well as the pivotal connections between various units. The rods 25 also form stringers, or beams, over which a suitable cover may be placed, which may be rigid or flexible as desired.

It is to be noted that the frame is based upon a pantograph principle, so that movement of any component member is transmitted to and causes a proportionate simultaneous movement of all the other members. For this reason, an erected frame might collapse in the absence of means to immobilize one or more of its members in erected position. To this end, a vertical brace bar 26 may be connected to the pivots 23 and 24, and secure it in place by means of nuts 27 threaded on the ends of rods 25. This effectively prohibits shift of the pivot axes toward or away from one another and locks the frame members against relative movement. Similar bracing can also be applied between the pivots 22 and 21 on each side of the frame.

Figures 9, 14, 15:
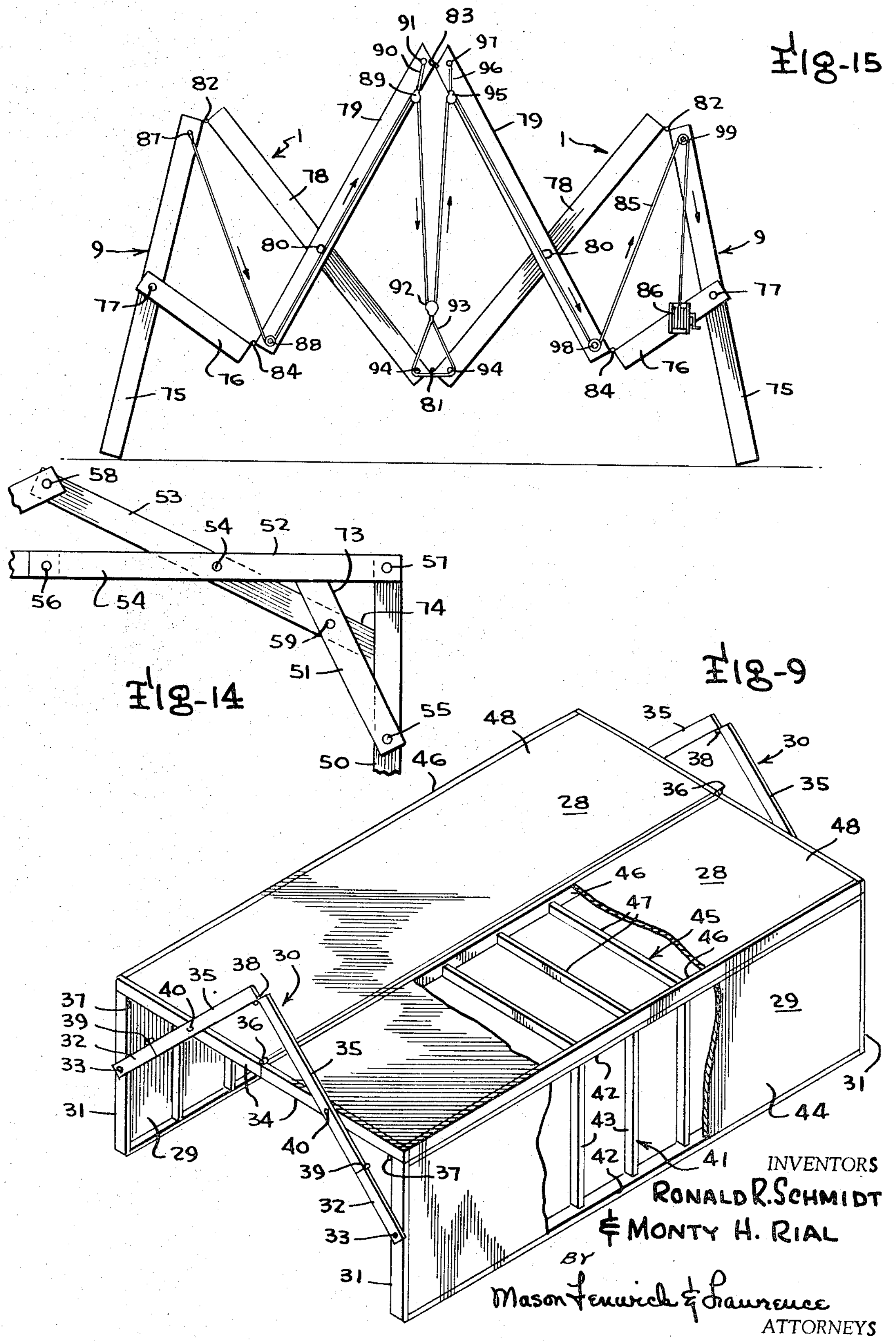
FIG. 9 is a perspective view of a complete shelter using frames of slightly modified form, the entire structure being collapsible.
FIG. 14 is an end elevation of a frame having corner braces shown in erected position.
FIG. 15 shows a frame in partially erected position, the frame having power means to move it to erected position.

FIG. 9 illustrates an embodiment of the invention in which a portable building assembly includes a pair of frames held in spaced, parallel relation by means of roof panels 28 and sidewall panels 29. The frames 30 differ from those previously described in that they consist of two of the basic units 1 (FIG. 1) and two of the basic units 9 (FIG. 3). The units 1 are joined together at the center of the frame, and the units 9 are connected to the ends of the center units and provide the outer portions of the frame. There are two other respects in which the frame 30 differs from the previously described frame. One of these is that the interconnected members of adjacent units lie in the same plane, rather than adjacent planes as before. The second difference is the ends of adjacent connected members are in abutting relation, and the pivotal connector at the abutting ends is a butt hinge.

To achieve the above-described results, the end units 9 are formed of vertical posts 31 and angularly arranged brace members 32, pivotally interconnected at the end of the brace 32 and intermediate the ends of the posts 31 by means of pivots 33. The end of brace 32 overlies post 31, so that the two elements lie in side-by-side relation in adjacent planes. The units 1, which form the center portions of the frames, have horizontal legs serving as roof joists 34, and angularly disposed legs which continue the brace action of the members 32 and complete the frame. These are shown at 35. The roof joists 34 are connected to each other by hinge 36, and to the tops of the posts 31 by hinges 37. The members 35 are hingedly connected to each other at the peak by hinge 38, and to the brace members 32 by hinges 39. It has been noted that hinges 36 and 38 are arranged so that the joint will open outwardly, while hinges 37 and 39 form joints which open inwardly. The members 34 and 35 of each unit 1 are pivotally interconnected at 40. The same distance relationships as previously set out will be maintained in this construction.

The end posts 31 of the frames form the ends of rectangular frames 41 of the sidewall panels 29. Top and bottom sills 42 connect the ends posts to complete the frame, while studs 43 extend between the sills to afford proper bracing. The entire panel is covered by a suitable wall material 44.

Roof joists 34 form the end members of frames 45 for the roof panels 28. The side members of the frame 45 are connected to the ends of the joists 34, and additional joists 47 may be placed between the members 46 to rigidify the roof structure. The entire roof panel has a covering 48. If the structure is a small one, the hinges between the frame members may be sufficient, but if the structure is a larger one it may be necessary to add additional hinges between the adjacent members of the frames 41 and 45, and the adjacent members of the two roof frames 45. If this is done, the hinges will have to have their hinge axes coaxial to the axes of the hinges of the frame members.

When the structure shown in FIG. 9 is to be collapsed, the hinge 36 will move downwardly causing the two roof panels to swing into face-to-face contact. The sidewalls will swing inwardly, so that their inner faces will be against the inner faces of the roof panels. The respective frame members will move as previously described.

Figure 10:
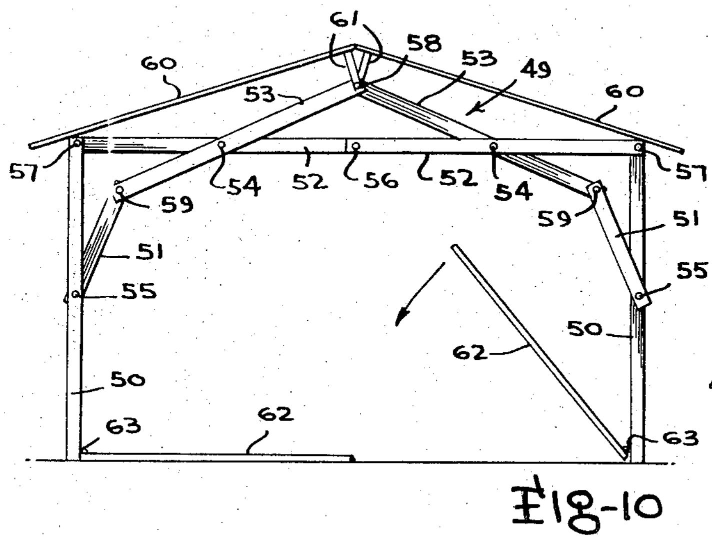
FIG. 10 is an end elevation of an erected shelter having a different arrangement of parts.
Figure 11:
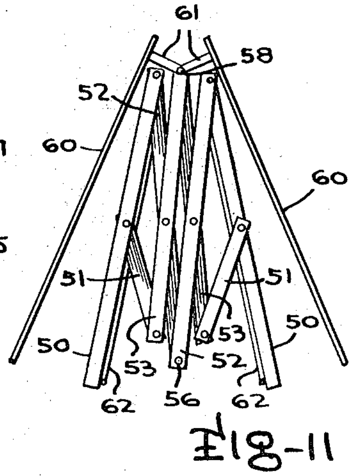
FIG. 11 shows the structure of FIG. 10 in partially folded condition.

FIGS. 10 and 11 show a slightly different type of shelter. In this case, the frames 49 include units 9 as the side elements, as do the frames of FIG. 9, but the members of the units are not in abutment as in FIG. 9, but are in staggered relation as in FIG. 5. The frames consist of the side posts 50 and the brace members 51, making up the units 9, and the roof joists 52 and members 53 making up the units 1. The members 52 and 53 are pivotally connected as at 54, and the members 50 and 51 are pivotally connected as at 55. The roof joists 52 are connected to each other at 56, and to the posts 50 at 57. The members 53 are connected to each other as at 58, and to the brace members 51 at 59.

Roof panels 60 have downwardly extending arms 61 at their inner edges, which are pivotally connected to the pivots 58 at the peak of the frame. The outer ends of the roof panels rest upon the frame corners at the junctions of the posts and roof joists. The only connection between the roof panels and the frames is by means of the pivots 58.

Floor panels 62 may be provided and pivotally connected at their outer edges to the lower ends of posts 50 by means of hinges 63. Each floor panel is of sufficient width to span half the distance between the side posts when the shelter is erected, so that when the floor sections are in horizontal position they completely cover the area between the posts. In narrow buildings, when the floor width does not exceed the wall height, one floor panel attached to one side wall may be used.

By slightly changing the dimensions of the brace arms and the members 53, the pivot 59 can be made to move over center, to increase the space within the structure. When the shelter is to be collapsed, the floor sections will be swung upwardly against the inner sides of the posts and, when the shelter is collapsed, the roof panels 60 will form outer covers along the sides of the folded structure.

Figure 12:
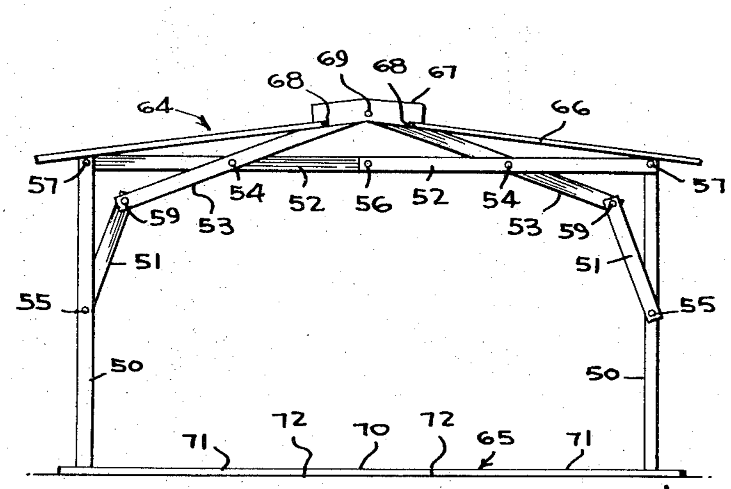
FIG. 12 is an end elevation of still another shelter arrangement, the shelter being shown in erected position.
Figure 13:
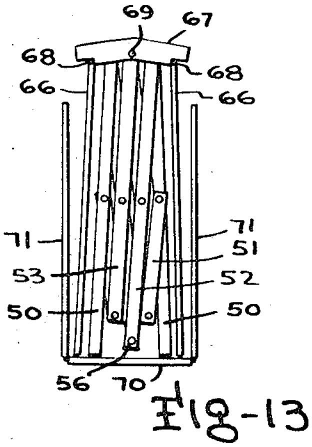
FIG. 13 is an end elevation of the FIG. 12 form in collapsed condition.

Another structural arrangement is shown in FIGS. 12 and 13. In this embodiment, the frame is exactly the same as in the form just described, and similar reference numerals have been applied. The roof 64 and floor 65 are different. The roof consists of a pair of roof panels 66 hingedly connected at their edges to opposite sides of a central crown block 67. As many hinges 68 as may be required to attach the inner side edges of the roof panels to the crown block may be used. The crown block, in turn, is pivotally mounted on the pivot axis 69 at the top of the A-portion of the frame. The outer edges of the roof panels rest upon the tops of the end posts of the frame as in the arrangement just described. The floor 65 is a separate member, unattached to the remaining portions of the structure. The floor is a three part member, consisting of the central panel 70 and two outer panels 71 hingedly connected at 72 to the sides of the central panel. When the floor is in unfolded condition, with all of the panel lying in a single plane, the frame structure may be seated upon it. When the frame is erected, the outer edges of the outer panels 71 of the flooring project beyond the side posts so as to provide a firm foundation.

FIG. 13 shows the structure in collapsed condition. The crown block 67 functions similarly to the arms 61 on the roof panels of the previously described form in spacing the roof panels apart a sufficient distance to depend on either side of the collapsed frames. The separate flooring has its outer panel folded upwardly and provides a U-shaped sheath for the collapsed shelter.

FIG. 14 shows a frame similar to the frames shown in FIGS. 10, 11, 12 and 13, but which is provided with corner braces to assist in rigidifying the structure when erected. As the same elements have been used as in the above-mentioned figures, the reference numerals for the elements and the pivotal connections are the same. Two of the elements are modified, however. These are the brace 51 of the basic unit 9, and the A-forming member 53 of the basic unit 1. These changes consist in extensions of the two members to provide corner braces. For example, brace 51 has a corner brace extension 73 projecting beyond the pivot 59 in longitudinal alignment with the portion of the brace between the pivots 55 and 59. The extension 73 has sufficient length to contact roof joist member 52 when the corner post and roof joist members are at the correct angle. The member 53 is likewise extended beyond the pivot 59 by an extension 74. Here, again, the extension is in longitudinal alignment with the remainder of the member and of sufficient length to contact the corner post when the frame is erected. Due to the staggered relationship of the elements of the adjacent basic units, the extension 73 will be in the same plane as the roof truss 52, and the extension 74 will be in the same plane as the end post 55. There is no difficulty in collapsing this type of structure, as the pivot 59 moves away from the pivot 57 allowing the extensions 73 and 74 to swing toward one another. As the corner post 50 must be moved outwardly to increase the angle between the corner post and the roof joist until the pivot 59 passes center, there will be ample room for the braces to swing out of contact relation with their respective members.

It may be desirable in some installations, to provide power means for erecting the shelter. This would be desirable where large shelters or shelters of heavy materials are used, or where it is required to erect a shelter with but one or two persons. Such an arrangement is shown in FIG. 15. The frame shown here consists of two basic units 1 at the center of the frame, and a basic unit 9 at each end of the frame. The basic units 9 consist of the corner posts 75 and brace members 76. The two are interconnected by pivot 77. The units 1 comprise roof joist elements 78 and A-forming members 79 pivotally interconnected at 80. The roof joists are connected to each other by hinge 81, and to the corner posts 75 by means of hinges 82. The A-forming members 79 are connected to each other by a hinge 83, and to the braces 76 by hinge 84. The power means shown consists of a cable 85 operated by a winch 86 to apply to the various components of the frame a combination of forces which act by their resultants to move the frame from collapsed to erected position. Winch 86 is pivotally secured to the brace 76 of one of the end units of the frame. The cable has one end attached to, and is wound upon, the winch, and has its opposite end fixed to a stud 87 located near the top of the post 75 of the end member opposite the one carrying the winch. The cable extends from stud 87 around a pulley 88 mounted on A-forming member 79 adjacent its lower end, then up and over a pulley 89 at the opposite end of the member 79. Pulley 89 is a movable one, being tethered by a connector 90 to a stud 91 at the top of member 79. From this point, the cable extends downwardly and around a pulley 92 which is also free floating. This pulley is connected to a loop 93 which is mounted on studs 94 mounted on the adjacent ends of the two roof truss elements 78. The cable extends upwardly from pulley 92 around the pulley 95, similarly mounted to the pulley 89 by means of connector 96 and stud 97 on the adjacent A-forming member 79. From here, the cable extends along the member 79 to a fixed pulley 98 mounted on the opposite end of the member 79, similarly to the pulley 88. The cable then extends upward to a pulley 99 at the top of corner post 75, and downwardly to winch 86. It will be observed, that when the winch is operated to wind up the cable, forces are exerted between the opposed end elements of each of the basic units to tend to draw these elements toward one another. This is precisely the force needed to bring the entire pantographic structure into erected position. When the winch is operated to unreel the cable, the hinge connections can be broken and the frame collapsed.

Figure 16:
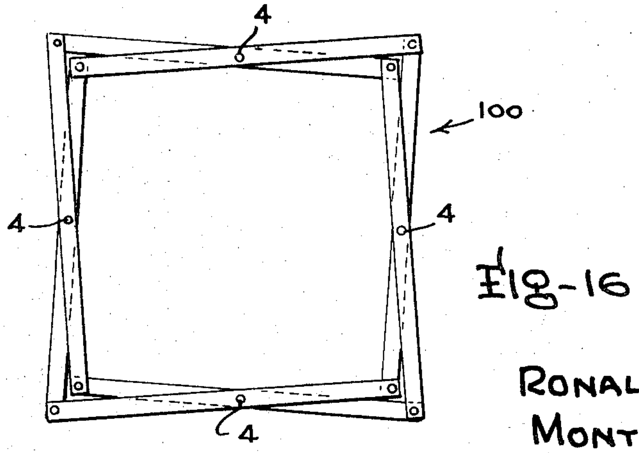
FIG. 16 is a plan view of a frame constructed of the base units usable in constructing columns, or columnar structures.

FIG. 16 shows in plan view a frame which can be used with other similar frames to erect a column or to construct a completely enclosed tunnel-like structure. The frame consists of at least three of the basic units 1 (four being shown) connected to one another as previously described to create the building frame. Instead of leaving the end members free, however, their free ends are brought together and connected to one another in the same manner of connection at the other joints. Thus, a continuous frame 100 is formed which will be of regular geometric configuration, having four sides of identical size and contour.

Figure 17:
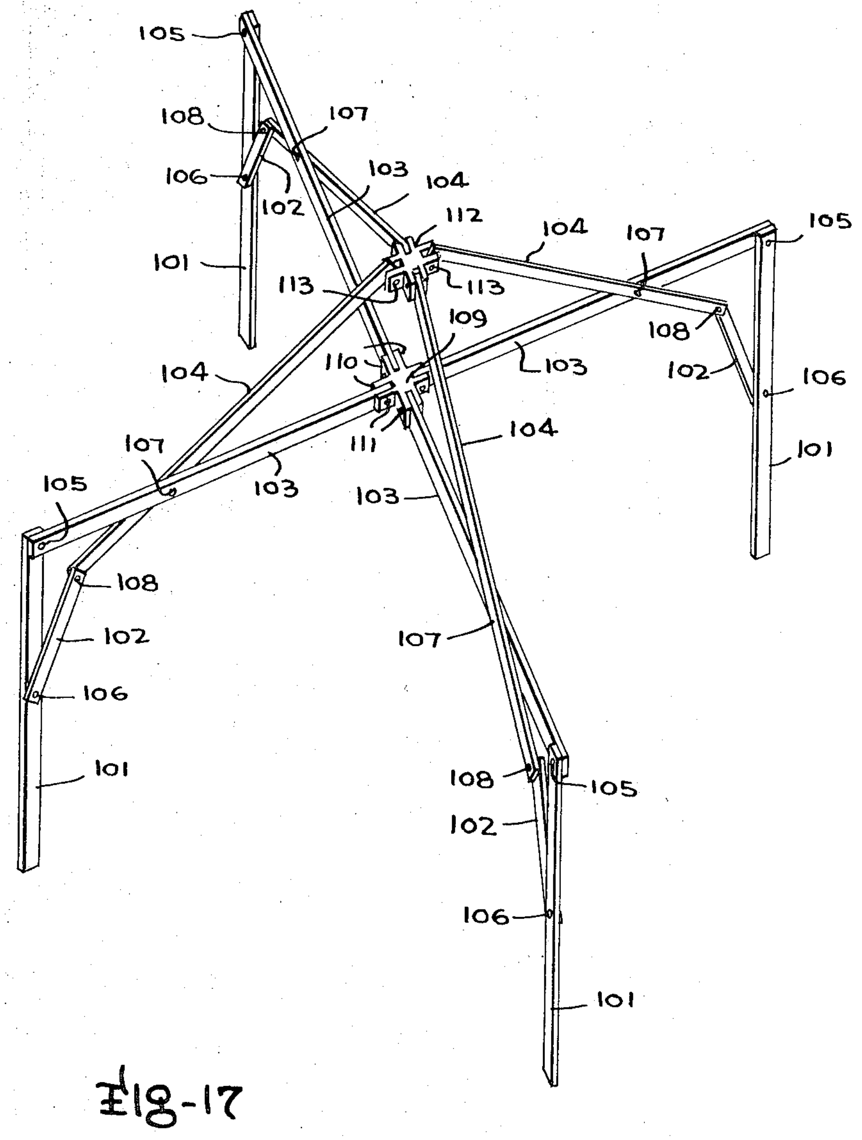
FIG. 17 is a perspective view of still another frame arrangement.

FIG. 17 shows still another type of shelter frame. Here, two frames (more could be used if desired) such as those shown in FIG. 10, are arranged at right angles to one another in crossing relation. In other words, the frames extend diametrically to a common center, with the frames spaced equiangularly from one another.

The frames each include units 9 at the sides and two units 1 intermediate the sides. Each frame has side posts 101, braces 102, joists 103 and roof members 104. The side posts are connected to the ends of joists 103 by pivots 105, and the side posts and braces are joined by pivots 106. The joists and roof member are connected intermediate their ends by pivots 107, and the members 104 are pivoted to the braces at 108. All of the joists have their inner ends pivotally connected to a coupler 109, which has four pairs of ears 110 arranged at ninety degree angles. Pivots 110 connect the joist ends to the coupler ears. The top ends of the members 104 are joined by a similar coupler 112 by means of pivot pins 113.

With the FIG. 17 form of the invention, the structure is caused to collapse by moving the couplers 109 and 112 away from one another. This will cause the same action as with the FIG. 10 form, but the several halves of the frames will move in radially to the couplers 109 and 112.

In all of the embodiments of the invention which have been disclosed, the structural units, whether of the basic type 1, the basic type 9, or combinations of the two, are connected in series in such a manner that the outer ends of similar members of adjacent units are always pivotally connected. Wherever this procedure is followed, the units will be joined in a manner to permit collapsing into a compact package and erection for use.

Although all of the complete structures and structural frames which have been shown disclose only a pair of frames in spaced, parallel relation, the frames may be used in any number required, for they may serve as intermediate supports as well as end supports. So long as the similar pivotal axes of the respective frames are in axial alignment, the same collapsing action can be had irrespective of the number of frames employed.

While in the above several embodiments of the invention have been disclosed, the specific structural arrangements shown and described are merely by way of example, and the invention may take other forms within the scope of the appended claims.

What is claimed is:

1. A foldable structure comprising, a pair of horizontal roof panels in edge abutment, hinge means connecting said roof panels along the tops of their abutting edges, a pair of vertical wall panels with one wall panel beneath and supporting the edge of each roof panel remote from the hingedly connected edges of the roof panels, hinge means connecting each wall panel to its respective overlying roof panel along the inner juncture of the wall and roof panels, an A-frame at each end of the roof and wall panels having legs pivotally interconnected to the roof panels at equal distances from the apex and at equal distances on either side of the roof panel hinge interconnection, and braces pivotally interconnected to the ends of the A-frame legs opposite the apex and to the side panels, the distance from the connection of the braces with the side panels to the connection to the legs being equal to the distance from the connection of the legs with the roof panels to the connection to the braces, the pivotal connections between the legs and braces forming butt joints, the ends of the roof panels and side panels lying in common vertical planes and the legs and braces of the respective A-frames lying in common vertical planes spaced from and outside the planes of the ends of the roof and side panels, whereby the roof and side panels can fold intermediate the A-frame.

2. A foldable structure as claimed in claim 1 additionally including winch, cable and pulley means on each end of said structure interconnecting said roof panels, wall panels, A-frame and braces on each end of the structure to move the roof and side panels and A-frame from folded to erected position.

3. A foldable structure comprising, a pair of horizontal joist members in a common plane hingedly connected at their ends, vertical side posts in said plane, hinge means connecting the upper ends of said posts to the ends of the joist members remote from the hinged connection of the joist members, the joist members and the side posts lying and movable in a common plane, an A-frame having legs pivotally interconnected at the apex and elongated brace members pivotally attached on one end to the side posts intermediate the ends of the side post, pivot means connecting said legs to the joist members intermediate the ends of said joist members, pivot means connecting the ends of said legs to the other ends of said braces, the A-frame legs and braces lying and movable in a common plane spaced from and parallel to the common plane of the joist members and side posts.

4. A foldable structure as claimed in claim 3 additionally including winch, cable and pulley means on said structure connecting said joist members, said side posts and said A-frame to move the folding structure from a folded to an erected position.

5. A foldable structure comprising a pair of spaced, parallel, vertical frames each including a pair of joist members pivotally connected at their ends, side posts pivotally connected to the opposite ends of the joist members, peak forming legs pivotally connected together at the apex of the peak and pivotally connected to the respective joist members intermediate the lengths of the legs and intermediate the lengths of the joist members, braces pivotally connected at their ends to the side posts and to the ends of the legs below the joist members, first and second roof panels having contiguous edges adjacent said apex and spacing means connected to said roof panels at said contiguous edges and pivotally connected to the pivotal connection at the apex of the legs, the opposite edges of the roof panels resting upon the post members, whereby said foldable structure may be collapsed by bringing the pivotal connection between said braces and said legs inwardly and downwardly while said pivotal connection between said joists is moved downwardly so that said vertical frames move inwardly toward each other to provide a resultant closely folded structure wherein said spacing means is of a width at least equal to one-half the width of said resultant closely folded structure whereby the roof panels may lie parallel to one another on the outside of the resultant closely folded structure.

6. A foldable structure as claimed in claim 5 wherein, the spacing means comprises arms extending from the roof panels adjacent said contiguous edges of said roof panels.

7. A foldable structure as claimed in claim 5 wherein, the roof panels are pivotally attached to the spacing means adjacent said contiguous edges.

8. A foldable structure as claimed in claim 5 additionally including at least one floor section pivotally connected to the bottom of one of the post members and foldable upwardly to lie against the post member.

9. A foldable structure as claimed in claim 5 additionally including a floor composed on hinged sections upon which the frames rest when in erected position and which folds about said closely folded structure.

References Cited

UNITED STATES PATENTS

| | | | |
|---|---|---|---|
| 43,113 | 6/1864 | Harold | 211—179 |
| 1,575,902 | 3/1926 | Dial | 135—4 |
| 1,666,757 | 4/1928 | Snyder | 135—4 |
| 2,592,610 | 4/1952 | Shumaker | 52—69 |
| 2,701,038 | 2/1955 | Mooney | 52—69 |
| 3,152,347 | 10/1964 | Williams | 52—109 |
| 3,375,624 | 4/1968 | Mikulin | 52—86 |
| 1,892,340 | 12/1932 | Guth | 160—165 |

FOREIGN PATENTS

| | | | |
|---|---|---|---|
| 7,755 | 3/1914 | Great Britain | 135—4 |
| 339,286 | 1933 | Great Britain | 52—66 |
| 854,106 | 1960 | Great Britain | 160—165 |

HENRY C. SUTHERLAND, Primary Examiner

U.S. Cl. X.R.

52—109, 646